Dec. 3, 1940. T. E. MURRAY Re. 21,649

BOILER

Original Filed Oct. 9, 1925 5 Sheets-Sheet 1

INVENTOR
THOMAS E. MURRAY, DECEASED
BY JOSEPH B. MURRAY AND
THOMAS E. MURRAY, JR. ADMX.

BY

Mann & Parker ATTORNEYS

Dec. 3, 1940. T. E. MURRAY Re. 21,649

BOILER

Original Filed Oct. 9, 1925 5 Sheets-Sheet 2

INVENTOR
THOMAS E. MURRAY, DECEASED
BY JOSEPH B. MURRAY AND
THOMAS E. MURRAY, JR., ADMX.

BY
Mima & Rauber ATTORNEYS

Dec. 3, 1940. T. E. MURRAY Re. 21,649

BOILER

Original Filed Oct. 9, 1925 5 Sheets-Sheet 3

INVENTOR
THOMAS E. MURRAY, DECEASED
BY JOSEPH B. MURRAY, AND
THOMAS E. MURRAY, JR, ADMX.

BY

Usman & Rauber ATTORNEYS

Dec. 3, 1940. T. E. MURRAY Re. 21,649

BOILER

Original Filed Oct. 9, 1925 5 Sheets-Sheet 4

INVENTOR
THOMAS E. MURRAY, DECEASED
BY JOSEPH B. MURRAY AND
THOMAS E. MURRAY, JR. ADMX.

BY

Usina & Rauber ATTORNEYS

Dec. 3, 1940. T. E. MURRAY Re. 21,649

BOILER

Original Filed Oct. 9, 1925 5 Sheets-Sheet 5

INVENTOR
THOMAS E. MURRAY, DECEASED
BY JOSEPH B. MURRAY AND
THOMAS E. MURRAY, JR. ADMX.

BY Usina & Rauber ATTORNEYS

Reissued Dec. 3, 1940

Re. 21,649

UNITED STATES PATENT OFFICE 21,649

BOILER

Thomas E. Murray, deceased, late of Brooklyn, N. Y., by Joseph B. Murray, Brooklyn, N. Y., and Thomas E. Murray, Jr., Brooklyn, N. Y., executors, assignors to Metropolitan Engineering Company, a corporation of New York Original No. 1,993,072, dated March 5, 1935, Serial No. 61,386, October 9, 1925. Application for reissue March 4, 1937, Serial No. 128,973

22 Claims. (Cl. 122—235)

In certain previous applications, particularly No. 642,725, patented February 11, 1930, Patent No. 1,746,711, there has been described boilers having walls or banks of water tubes exposed to the direct radiant heat of the burning fuel, whereby the rating or production of steam is very much increased as compared with boilers of previous types.

The present invention is directed to a boiler in which this principle is utilized to the fullest possible extent, and is directed to various other features described in detail hereinafter. The accompanying drawings illustrate embodiments of the invention.

Figure 1:
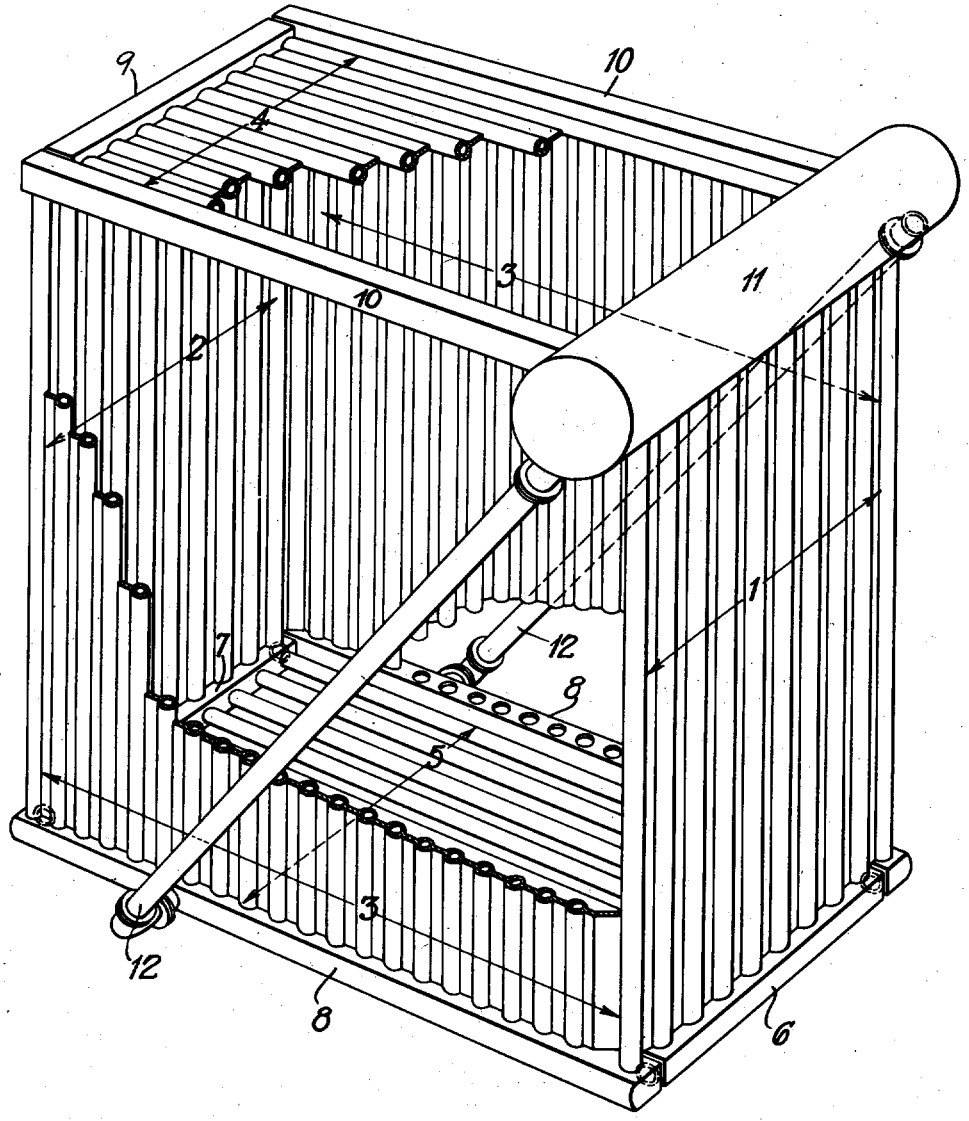
Figure 2:
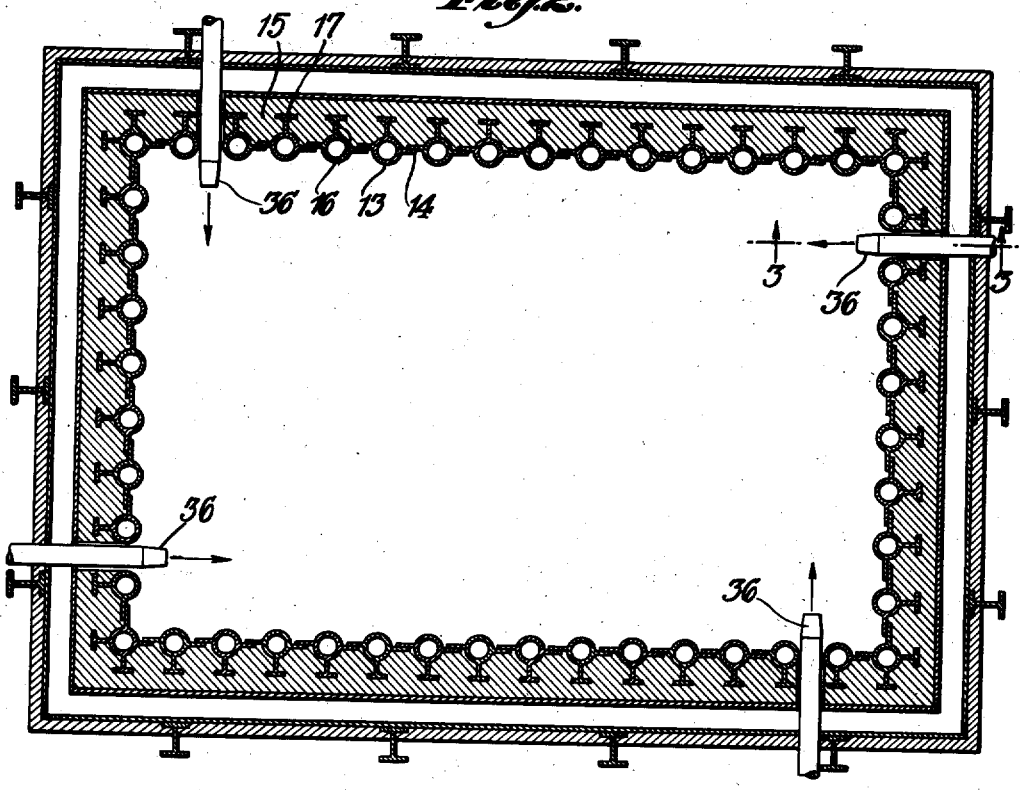
Figure 3:
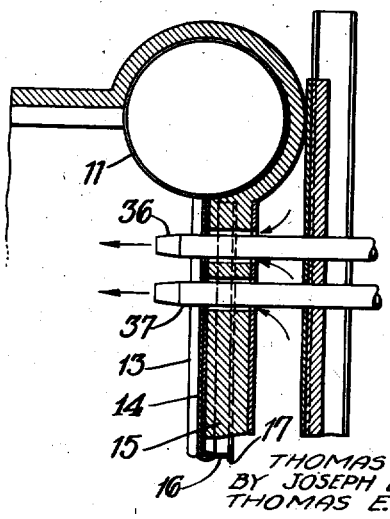
Figure 4:
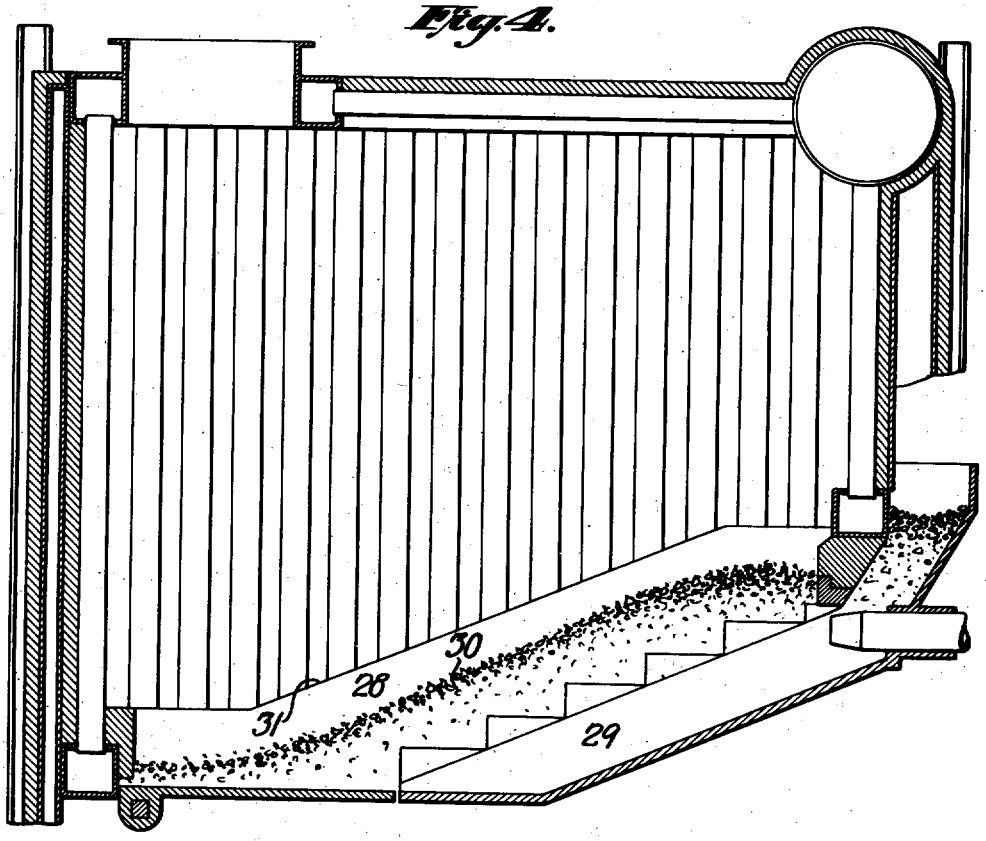
Figure 5:
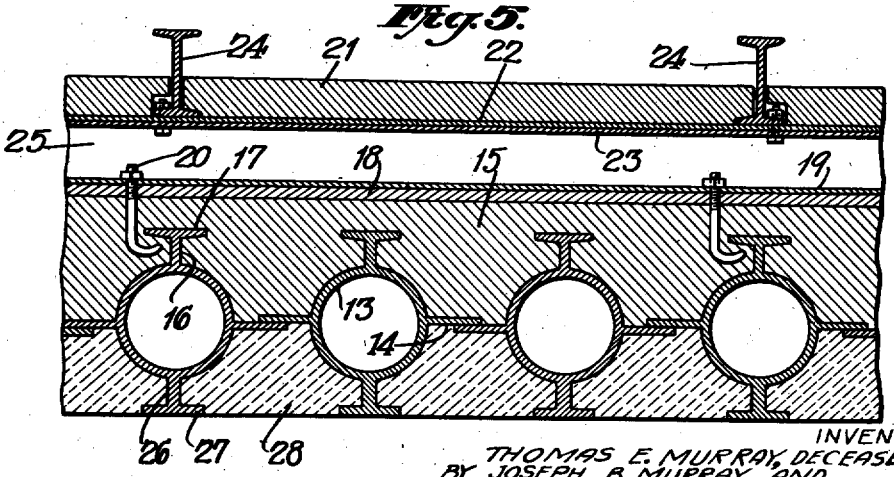
Figure 6:
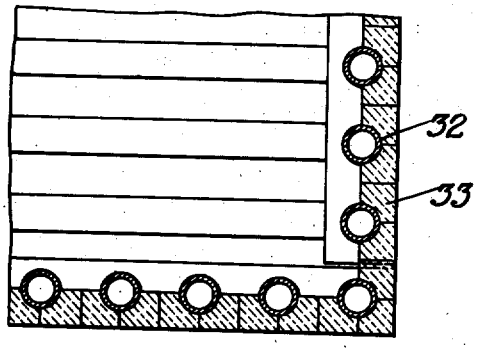
Figure 7:
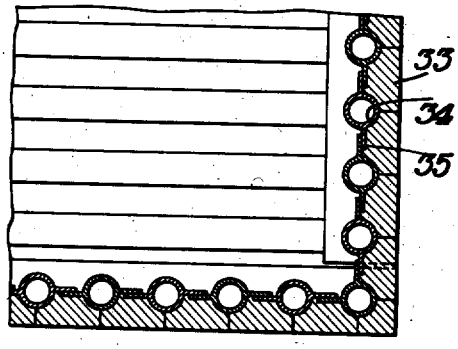
Figure 8:
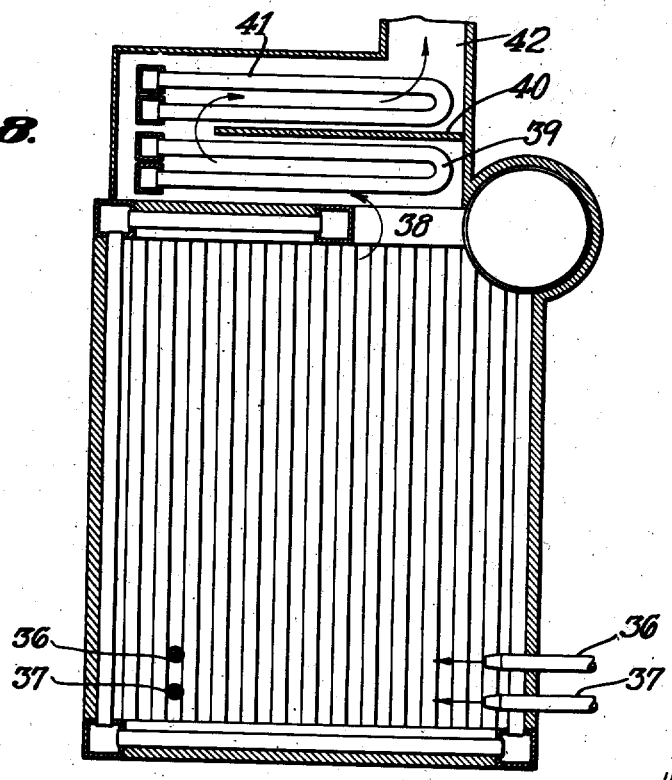
Figure 10:
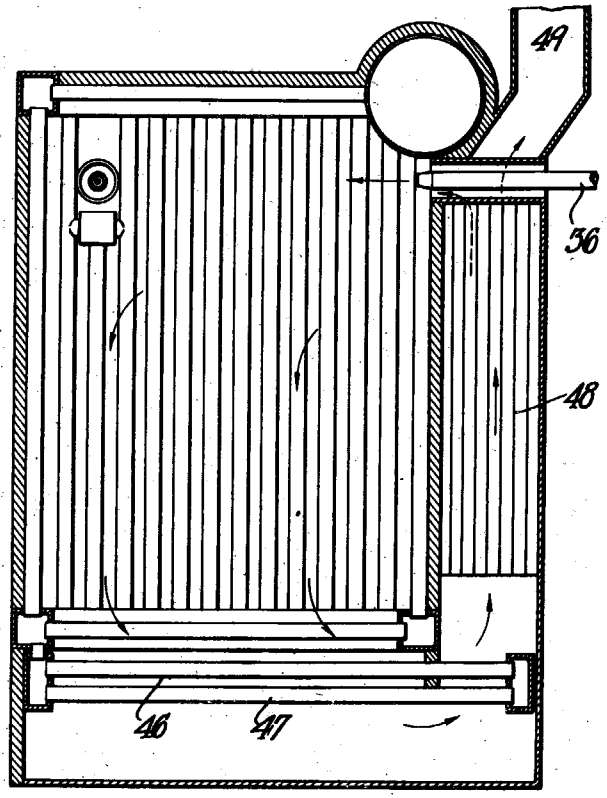
Figure 9:
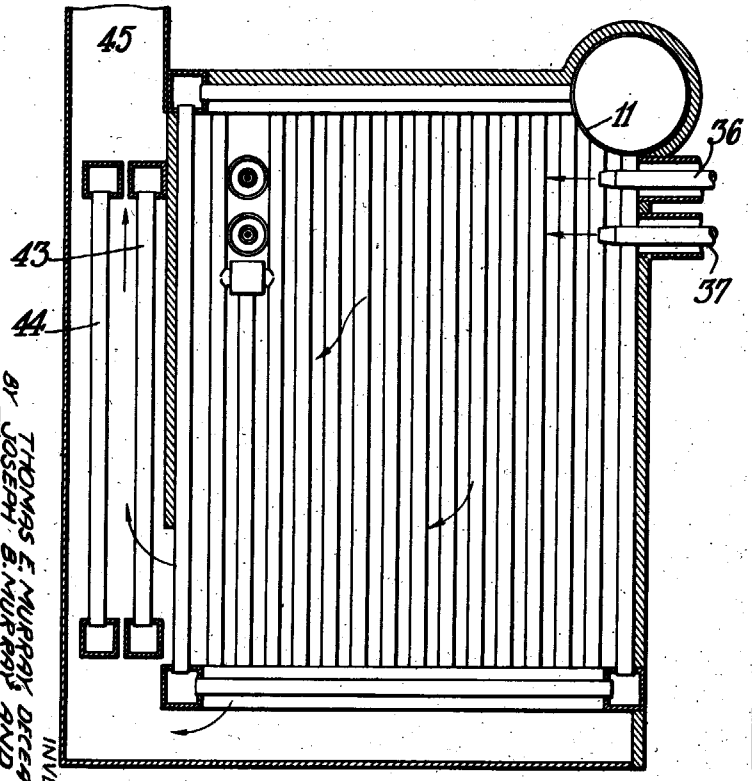

Fig. 1 is a perspective view, partly broken away to show the interior, of a system of tubes arranged on the six sides of a rectangular furnace or combustion chamber; Fig. 2 is a horizontal section showing the tubular walls surrounded by refractory material and a supporting structure; Fig. 3 is a section on the line 3—3 of Fig. 2; Fig 4 is a vertical section of a stoker-fired boiler; Fig. 5 is a horizontal section of the lower part of one of the boiler walls; Figs. 6 and 7 are partial horizontal sections illustrating modifications; Figs. 8, 9 and 10 are vertical sections illustrating different paths of the hot gases passing out of the combustion chamber.

Referring first to Fig. 1, there are front walls 1, back walls 2 and side walls 3 composed of vertical tubes spaced apart with flanges extending across the spaces, and similar longitudinal tubes arranged to form a top wall 4 and bottom wall 5. The firing nozzles or grate and the passages for the gases are omitted from this figure, as are also the surrounding walls of refractory material. These details may be varied in design and arrangement, as illustrated, for example, in the other figures.

The tubes of the front and rear walls 1 and 2 and of the bottom wall 5 communicate at their lower ends with headers 6 and 7. The tubes of the opposite side walls 3 communicate with bottom headers 8 which are connected at their ends to the ends of the headers 6 and 7. A header 9 on the upper ends of the tubes 2 communicates with the tubes 4 of the top wall and also with the ends of the upper headers 10 of the side walls. A steam drum 11 receives steam directly from the tubes of the front wall 1 and of the top wall 4 and also from the upper headers 10. The steam is taken off from the drum in any usual way. The water from the drum passes out of its ends by down-comers 12 to the lower headers 8. The tubes and headers which are shown horizontal may be slightly inclined upward in the direction of flow if preferred, and the circulation may be provided for in various other ways.

The water entering the lower headers 8 passes into the headers 6 and 7, the bottom wall 5 and the lower ends of the front, back and side wall tubes. Thence the wet steam and water pass upward to the headers 9 and 10, the top wall 4 and the upper end of the front wall 1, where they pass into the drum 11.

The fuel is burned in the combustion chamber enclosed by the tubular walls, so that all the tubes are exposed to the direct radiant heat of the burning fuel and steam is generated at a very high rate and very efficiently.

As illustrated in Fig. 2, the individual tubes 13 are provided each with two flanges 14 overlapping those of the adjacent tubes, so as to substantially close the space between them, while leaving the tubes free to expand or contract independently of one another, and to be separately renewed when necessary. A layer or wall of refractory or insulating material is arranged outside of the tubes. Preferably, this consists of plastic insulating material 15 tied to the tubes by means of flanges 16 on the latter having lateral extensions 17 embedded in the plastic material. The flanges 14 and 16 are secured to the tubes by welding, or other methods.

Outside of the plastic material 15 there is (see Fig. 5) preferably a facing 18 of cement and a steel plate 19 fastened by means of anchors 20 embedded in the insulating material and out of contact with the tubes to avoid conduction of heat therefrom.

The vertical walls of the boiler made as described are preferably surrounded by a wall of brickwork or other masonry 21 built up against an insulating plate 22 and a steel plate 23 bolted to columns 24 which support the roof of the boiler or other parts of the surrounding structure. The space 25 between the outer and inner walls serves as an insulating air space and may also be used as a pre-heating passage for the air used for combustion.

In some boilers it is desirable to protect parts of the inner face of the water walls from too great heat or, for other reasons, to interpose a shield between parts of the tubing and the combustion chamber. In such cases the parts of the tubes to be shielded are provided with anchoring means such for example as the flanges 26, preferably having lateral extensions 27, and a layer of plastic material 28 is applied. embedding the flanges 26 and being thus reinforced and tied to the tubular structure. The anchoring means for each tube is separate from those for other tubes so as to offer no obstacle to separate movement of the tubes in use. The plastic layer 28 may completely cover the anchoring means as in Fig. 4, or may be laid flush therewith as in Fig. 5.

In Fig. 4 the entire bottom wall is occupied by a stoker 29 on which the coal is indicated at 30. The line 31 indicates the top of the refractory protecting material 28. This part of the side walls and rear end wall is practically in immediate contact with the fuel. The shield 28 prevents burning out of the tubes and also prevents undue cooling of the fuel.

Fig. 6 illustrates certain modifications in detail. Tubes 32 are used without fins, the spaces between the tubes being filled by refractory bricks 33 shaped to provide grooves for the tubes and to constitute an enclosing wall.

Fig. 7 also illustrates an enclosing wall of refractory bricks 33. The tubes 34 in this case are provided with overlapping flanges 35 (similar to those in Fig. 5), but without flanges to tie in the refractory material.

The materials which have been referred to herein as "refractory" are not necessarily adapted to withstand extremely high temperatures, as the term is often understood in the art of furnace construction. They need be only sufficiently refractory to withstand the temperatures to which they are severally exposed; which for some of these materials are not very high.

Instead of using a grate fired boiler it is preferred to use pulverized coal or similar jet fuel introduced through nozzles 36 (Fig. 2), arranged to inject the fuel in jets at different angles so as to secure a thorough admixture during combustion and a uniform distribution of the gases against the different water walls. Preferably the burners or nozzles are arranged in sets of two or more 36 and 37 grouped together as in Fig. 3 to provide for a wide variation in capacity of the boiler. When running at the highest rating all the nozzles in a group will be used. For a lower rating a smaller number of nozzles in each group may be used, securing the same velocity of the jets for a decreased quantity of fuel.

Fig. 8 shows an arrangement of the nozzles at the lower end of the chamber and the exhaust gases from the boiler proper passing by an outlet 38 to and around tubes 39, a baffle 40 and tubes 41 and thence out by a flue 42. The tubes 39 and 41 may be any supplementary heating devices such as economizers, air heaters or superheaters, or even supplementary boiler tubes.

According to Fig. 9, the fuel is admitted at the top and the waste gases pass downward as indicated by the arrows to supplementary heating tubes 43 and 44, and thence out by way of flue 45.

According to Fig. 10, the fuel enters at the top and passes down between the bottom boiler tubes to supplementary tubes 46 and 47 and thence through an air heater 48 to the flue 49, the heated air being used for combustion or other desired purpose.

The bottom shown in Fig. 1 is made of tubes spaced apart without intervening flanges or fillers. This design is intended for use with nozzle burners of the type illustrated in Figs. 2 and 3. The coal or other fuel burned in suspension produces a certain quantity of ash, which is allowed to fall through the spaces between the floor tubes. The chamber, as a whole, then is closed except for openings which admit the fuel and those which permit the passage of the products of combustion, ash at the bottom and exhaust gases at the top. Similarly, in the grate fired boiler of Fig. 4, there is a swinging gate at the bottom, which opens to dump the ash.

Various other usual or suitable provisions for admitting the fuel and discharging the products of combustion may be used. The passage for the exhaust gases may also be in another one of the six walls (four sides, top and bottom). Fig. 8, for example, shows the exhaust gases going out at the top; Fig. 9, at one side and Fig. 10 at the bottom. The tubes which constitute the walls are exposed to radiant heat of the burning gases. The supplementary tubing shown in Figs. 8, 9 and 10 is heated by convection, that is by the passage over them of the exhaust gases from the combustion chamber.

Even the lower part of the tubing in Fig. 4 is heated by the radiant heat of the fuel bed and the flames above it, although the heat has to be transmitted through the protecting layer of plastic material.

There is a considerable advantage in having the convection tubes outside of the combustion chamber and in such a position as to be shielded wholly or largely from the radiant heat. The side walls are of a solid construction as illustrated, for example, in Fig. 2. The burning of the fuel therein tends to deposit and maintain a coating of slag on the tubes which builds out to a thickness dependent on the conditions. The high temperature melts the mineral matter in the flame, particularly in the case of powdered coal burners. The liquid ash or slag coming into contact with the water tubes is cooled thereby sufficiently to adhere to them. As the coat thickens the cooling effect of the water in the tubes is diminished. The wall builds out to a thickness such that its surface is so hot that the molten slag runs down the face of it; the heating effect of the flame and the cooling effect of the water being approximately balanced. Such a coating offers no substantial objection within the combustion chamber. It protects the tubes from excessively hot flames and protects the flames from the cooling effect of the water walls.

The same conditions, however, do not apply to convection tubes such as are shown, for example, at 39 and 41 in Fig. 8, 43 and 44 in Fig. 9 and 46 and 47 in Fig. 10. These tubes are necessarily spaced apart providing passages between the tubes. They are remote from the flames and are shielded from the direct radiant heat of the flame at least to such an extent as to prevent any substantial accumulation of slag on the tubes such as would block the passages between them. This is particularly important in connection with the horizontal tubes 39, Fig. 8. With vertical tubes as in Fig. 9, any slag tends to run down and so to leave the convection passages clear; the result depending finally on the heat and operating conditions. Where the convection tubes are horizontal or at such a slight angle to the horizontal as not to cause a downflow of slag thereon, it is important that they be arranged so as to prevent the forming of slag thereon.

This arrangement has particular advantages in installations where it is desired to use a flame of extreme intensity. Such a flame causes continuous slagging on the side walls and ensures the maintenance of a coating thereon. But the higher the temperature of the flame, the greater the distance to which its slag-depositing effect extends. By protecting the convection tubes from the radiant heat, therefore, the furnace can be run much hotter than if there were no such protection. Any ash remaining in the stream of hot air will fail to accumulate on such convection tubes. It will be so dry as to fall off the tubes or to be carried through the spaces between the tubes with the gas stream.

Various other modifications may be made by those skilled in the art, without departing from the invention as defined in the following claims.

What is claimed is:

1. A boiler having a combustion chamber all the side walls of which comprise separate upright steam generating tubes, each wall being closed to prevent the passage of the heating gases between said tubes and each wall being in line between the outermost tubes of the walls adjacent to it so as to form a complete enclosure with each of the tubes exposed to the radiant heat of the burning fuel.

2. The boiler of claim 1 in combination with refractory material on the outer sides of the tubes and projections on the tubes embedded in the refractory material and tying it to the tubes.

3. The boiler of claim 1 in combination with headers at the top and bottom respectively of said tubes, the headers at the bottom being in direct communication with each other and those at the top being in direct communication with each other.

4. A boiler having a combustion chamber all the side walls of which comprise separate upright steam-generating tubes, each wall being closed to prevent the passage of the heating gases between said tubes, and each wall extending continuously between the ends of the walls adjacent to it so as to form a complete closure with refractory material on the outer sides of the tubes and tied to the tubes.

5. A boiler having a combustion chamber all the side walls of which comprise separate upright steam-generating tubes, each wall being closed to prevent the passage of the heating gases between said tubes, and each wall extending continuously between the ends of the walls adjacent to it so as to form a complete closure, in combination with refractory material on the outer sides of the tubes and projections on the tubes embedded in such refractory material and tying it to the tubes.

6. The boiler of claim 5, and refractory material on the inner sides of the tubes covering only the lower portion thereof, leaving the upper portion exposed directly to the heating gases.

7. A boiler having a combustion chamber of which all the side walls and the top wall are composed of steam generating tubes of substantially circular section, means to close all of said walls between said tubes to prevent the passage of the heating gases between said tubes except one wall through which the gases pass on their way to the exhaust flue.

8. A boiler having a combustion chamber of which all the side walls and the top wall are composed of steam generating tubes of substantially circular section, means to close all of said walls between said tubes to prevent the passage of the heating gases between said tubes except one wall through which the gases pass on their way to the exhaust flue, in combination with supplementary tubes over which the exhaust gases from the combustion chamber pass so as to heat them by convection.

9. The boiler of claim 1 in combination with additional steam generating tubes heated by convection from the gases passing out of the combustion chamber.

10. The boiler of claim 1 in combination with additional steam generating tubes located above the combustion chamber and heated by convection from the gases passing out of said chamber.

11. A boiler having a combustion chamber with five walls, four at the sides and one at the top, four of them being metal walls including steam-generating tubes of substantially circular section and means to close said walls between said tubes to prevent passage of the heating gases therebetween, the fifth also including steam-generating tubes and having openings through which the gases pass on their way to the exhaust flue.

12. A boiler having a combustion chamber with five walls, four at the sides and one at the top, four of them being metal walls including steam-generating tubes of substantially circular section and means to close said walls between said tubes to prevent passage of the heating gases therebetween, the fifth also including steam-generating tubes and having openings through which the gases pass on their way to the exhaust flue, in combination with supplementary tubes over which the exhaust gases from the combustion chamber pass so as to heat them by convection.

13. A boiler having a combustion chamber with five walls, four at the sides and one at the top, four of them being metal walls including steam-generating tubes spaced apart with metal fillers between them to form closed metal walls and the fifth also including steam-generating tubes and having openings through which the gases pass on their way to the exhaust flue.

14. A boiler having a combustion chamber of which all the side walls and the top and bottom walls are metal walls including water tubes of substantially circular section, one of said walls being open to permit the passage of gases to the exhaust flue, another being open to permit the discharge of ash and the remainder being closed between said tubes to prevent passage of gases therebetween.

15. A boiler having a combustion chamber of which all the side walls and the top and bottom walls are metal walls including water tubes of substantially circular section, one of said walls being open to permit the passage of gases to the exhaust flue, another being open to permit the discharge of ash and the remainder having the tubes spaced apart with metal fillers between them to form closed metal walls.

16. The boiler of claim 14, in combination with nozzle burners discharging into the combustion chamber.

17. A boiler having a combustion chamber, all the sides and the top of which are metal walls including water tubes of substantially circular section and exposed to the radiant heat of the burning fuel, and closing means between said tubes to prevent the passage of gases therebetween, said metal walls constituting a complete closure except for the openings for passage through the chamber of the fuel and its products.

18. A boiler having a combustion chamber the side walls of which comprise upright steam generating tubes of substantially circular section and are closed to prevent the passage of heating gases between the tubes and to form a complete enclosure with the tubes exposed to the radiant heat of the burning fuel in combination with additional tubes heated by convection from the gases passing out of the combustion chamber, said convection tubes being shielded from the radiant heat of the burning fuel in the combustion chamber.

19. A boiler having a combustion chamber the side walls of which comprise upright steam generating tubes of substantially circular section and are closed to prevent the passage of heating gases between the tubes and to form a complete enclosure with the tubes exposed to the radiant heat of the burning fuel in combination with additional substantially horizontal tubes located above the combustion chamber, heated by convection from the gases passing out of said chamber and shielded from the radiant heat of the burning fuel in the combustion chamber.

20. A boiler having a combustion chamber the side walls of which comprise upright steam generating tubes of substantially circular section and are closed to prevent the passage of heating gases between the tubes and to form a complete enclosure with the tubes exposed to the radiant heat of the burning fuel in combination with additional tubes heated by convection from the gases passing out of the combustion chamber, said convection tubes being shielded from the radiant heat of the burning fuel in the combustion chamber and nozzle burners discharging into the combustion chamber so as to burn the fuel in suspension therein.

21. A steam generator comprising a combustion chamber and a number of convection heating tubes outside of said combustion chamber, said combustion chamber having side walls and a top wall composed of steam generating tubes of substantially circular section, one of said walls shielding said convection heating tubes from the direct radiant heat of combustion gases in said combustion chamber, and one wall permitting passage of combustion gases from said combustion chamber to said convection heating tubes, said walls being closed between said tubes, except for said passage from said combustion chamber to said convection heating tubes.

22. A steam generator comprising a combustion chamber and a number of convection heating tubes outside of said combustion chamber, said combustion chamber having side walls and a top wall composed of steam generating tubes of substantially circular section, one of said walls shielding said convection heating tubes from the direct radiant heat of combustion gases in said combustion chamber, and one wall permitting passage of combustion gases from said combustion chamber to said convection heating tubes, said walls being closed between said tubes, except for said passage from said combustion chamber to said convection heating tubes, and means secured to individual tubes for anchoring heat insulating material to said closed wall.

JOSEPH B. MURRAY,
THOMAS E. MURRAY, JR.,
*Executors of the Estate of Thomas E. Murray, Deceased.*